United States Patent
Schliwa et al.

(10) Patent No.: US 9,573,689 B2
(45) Date of Patent: Feb. 21, 2017

(54) APPARATUS FOR HOLDING A CABIN ATTENDANT SEAT, CABIN ARRANGEMENT IN A VEHICLE AND VEHICLE HAVING A CABIN AND SUCH A CABIN ARRANGEMENT

(71) Applicant: Airbus Operations GmbH, Hamburg (DE)

(72) Inventors: Ralf Schliwa, Hamburg (DE); Roland Lange, Nottensdorf (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 14/672,883

(22) Filed: Mar. 30, 2015

(65) Prior Publication Data
US 2015/0284097 A1 Oct. 8, 2015

(30) Foreign Application Priority Data
Apr. 4, 2014 (EP) ..................................... 14163550

(51) Int. Cl.
*B64D 11/06* (2006.01)
*B64D 13/00* (2006.01)
(Continued)

(52) U.S. Cl.
CPC ....... *B64D 11/0698* (2014.12); *B64D 11/0007* (2013.01); *B64D 11/02* (2013.01); *B64D 11/04* (2013.01); *B64D 11/0691* (2014.12)

(58) Field of Classification Search
CPC ............. B64D 11/0691; B64D 11/0698; B64D 11/0639; B64D 11/06; B64D 25/04; B60N 2/062; B60N 2/3025
(Continued)

(56) References Cited

U.S. PATENT DOCUMENTS 5,632,521 A    5/1997   Archambault et al.
2012/0199695 A1*   8/2012   Isherwood ......... B64D 11/0691
                                                  244/118.6
(Continued)

FOREIGN PATENT DOCUMENTS

DE    10 2011 016031 A1   10/2012
EP    2 690 016 A2   1/2014
WO   2012/110643 A1   8/2012

OTHER PUBLICATIONS

Search Report EP 14 163 550.8 dated Oct. 17, 2014.

*Primary Examiner* — Richard G Davis
(74) *Attorney, Agent, or Firm* — Lerner, David, Littenberg, Krumholz & Mentlik, LLP

(57) ABSTRACT

An apparatus for holding a cabin attendant seat in a cabin of a vehicle includes a base body attachable to a wall surface in the cabin, at least one holding mechanism for holding a cabin attendant seat, at least one linear movement mechanism, and at least one arresting mechanism. The at least one linear movement mechanism is attached to the base body and supports the at least one holding mechanism. The at least one linear movement mechanism is configured for laterally moving the at least one holding mechanism between at least two laterally distanced discrete positions. The at least one arresting mechanism is coupled with the at least one linear movement mechanism and is configured for arresting the at least one linear movement mechanism in the at least two discrete positions. By this apparatus a very space effective provision of a cabin attendant seat especially on a monument is given.

16 Claims, 13 Drawing Sheets

(51) Int. Cl.
*B64D 11/00* (2006.01)
*B64D 11/02* (2006.01)
*B64D 11/04* (2006.01)

(58) Field of Classification Search
USPC .............................. 244/118.5, 118.6, 122 R
See application file for complete search history.

(56) References Cited

U.S. PATENT DOCUMENTS

| | | | |
|---|---|---|---|
| 2013/0001359 A1* | 1/2013 | Schliwa ................. | B64D 11/02 244/118.6 |
| 2013/0334369 A1* | 12/2013 | Schliwa ................. | B64D 11/02 244/118.5 |
| 2014/0048650 A1 | 2/2014 | Schliwa et al. | |
| 2015/0151651 A1* | 6/2015 | Stingle ................. | B60N 2/0732 296/65.11 |

* cited by examiner

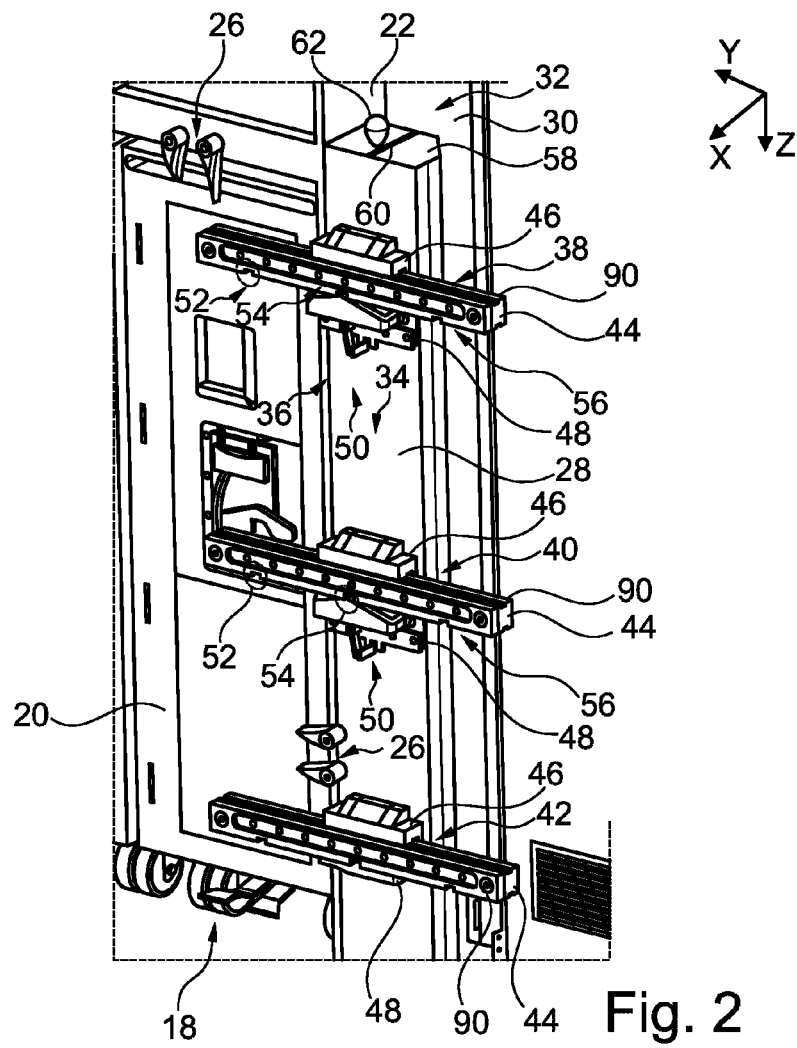
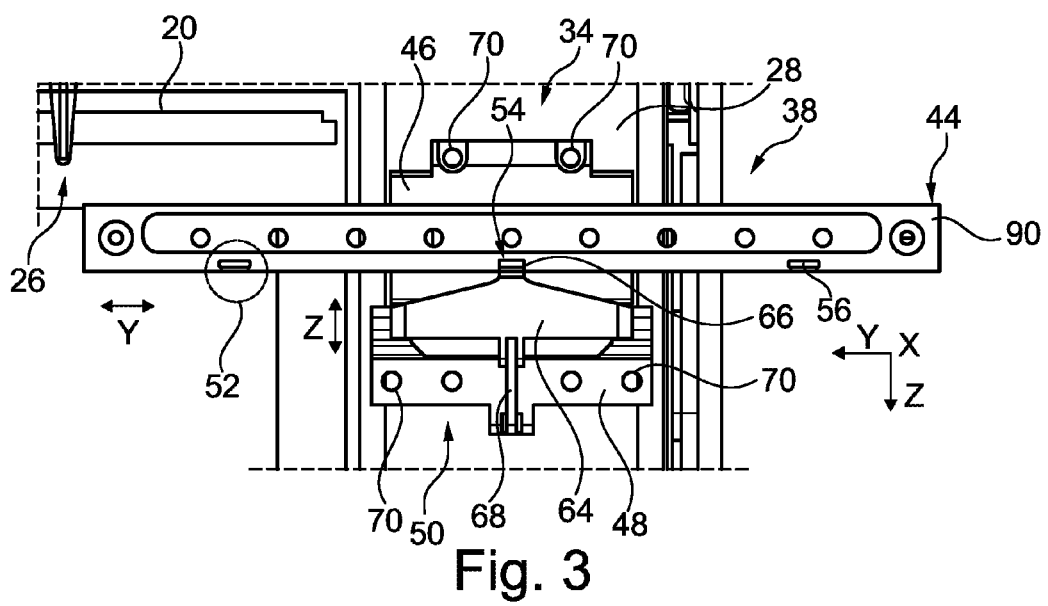

APPARATUS FOR HOLDING A CABIN ATTENDANT SEAT, CABIN ARRANGEMENT IN A VEHICLE AND VEHICLE HAVING A CABIN AND SUCH A CABIN ARRANGEMENT

FIELD OF THE INVENTION

The invention relates to an apparatus for holding a cabin attendant seat in a cabin of a vehicle, to a cabin arrangement in a vehicle as well as a vehicle having a cabin and a cabin arrangement installed therein.

BACKGROUND OF THE INVENTION

In the layout of a passenger cabin of a vehicle, an important objective frequently is the maximization of the available number of passenger seats that is limited by the number of mandatory seats for crew members, as well as mandatory safety devices, arbitrary service equipment and toilets. The proportion of the number of passenger seats to the remaining equipment in passenger cabins is a factor that influences the determination of the operating efficiency of an aircraft in scheduled air traffic. In addition to official regulations for the type certification and the operating permit of vehicles, the operators of the vehicles also need to take into account customer's needs such as, for example, customized special installations in the selection of seat sizes, seat spacings, service equipment and toilets. Depending on the design of fixtures in the passenger cabin and their space requirement, intelligent construction and configuration solutions can optimize the number of passenger seats.

BRIEF SUMMARY OF THE INVENTION

An aspect of the invention may provide an improved holder for a cabin attendant seat, which obstructs cabin installations less than known holders, and which allows to increase the available and usable space especially of a cabin monument.

In an embodiment, an apparatus for holding a cabin attendant seat in a cabin of a vehicle, comprises a base body attachable to a wall surface in the cabin, at least one holding means for holding a cabin attendant seat, at least one linear movement means and at least one arresting means. The at least one linear movement means is attached to the base body and supports the at least one holding means. The at least one linear movement means is configured for laterally moving the at least one holding means between at least two laterally distanced discrete positions. Further, the at least one arresting means is coupled with the at least one linear movement means and is configured for arresting the at least one linear movement means in the at least two discrete positions.

The base body is a component, which is attachable to a wall surface of any installation in the cabin, e.g. a monument, a partition wall or any other means providing a wall surface. The shape of the base body is not relevant for the function of the apparatus according to an embodiment of the invention, but it may be worthwhile to provide a base body as compact as possible. For example, the base body may comprise an elongate shape, which is to be installed in a vertical manner so as to provide support means sufficient for the vertical extension of the cabin attendant seat to be held. In this regard, the base body may extend from a floor in the cabin to a top vertical position required for holding the cabin attendant seat, however, this is not required. This means, that the base body may also extend from a lower support position to a top support position, wherein the lower support position may have a certain vertical distance to the floor, in the range of the seat surface +/−20 cm.

The at least one holding means for holding a cabin attendant seat may be of any suitable shape that allows to hold the cabin attendant seat. Further below, a plurality of different holding means are mentioned.

As explained previously, the apparatus according to an embodiment of the invention is configured for holding a cabin attendant seat. This is conducted by providing at least one holding means, which is couplable with the actual cabin attendant seat. Some features of the apparatus according to an embodiment of the invention are rendered more clear by referring to the cabin attendant seat, which is to be attached to the at least one holding means. This may, for example, relate to the cabin attendant seat's extension or its rough measures. In the following, it may also be referred to the cabin attendant seat without the cabin attendant seat being a part of the apparatus according to an embodiment of the invention. As the apparatus according to an embodiment of the invention is designed to hold a cabin attendant seat, this reference does not affect the scope of protection.

The at least one linear movement means may include a rail with or without a ball bearing, telescopic movement means or any other means for providing a linear movement. In this regard, the linear movement means allows a lateral movement of the at least one holding means between at least two laterally distanced discrete positions. "Lateral" stands for a direction parallel to a floor and vertical to the main extension direction of the cabin attendant seat. This is a sideways direction from a position sitting on the cabin attendant seat.

As the cabin attendant seat comprises a distinct vertical extension, it may be worthwhile to consider a plurality of linear movement means, wherein at least two linear movement means suggest itself. For example, there may be provided a lower linear movement means arranged at a lower end of a cabin attendant seat and a top linear movement means, arranged at a top end of the cabin attendant seat.

The at least one arresting means is an apparatus that is configured for a mechanical fixation of the at least one movement means in predetermined relative positions to the base body, which leads to maintaining relative positions between the cabin attendant seat and the wall surface, to which the base body is attached to.

In this regard, it is further stressed that the at least one arresting means is not necessarily directly mechanically connected to the at least one linear movement means. However, the at least one arresting means is capable of influencing the at least one linear movement means for being arrested.

The actual number of the arresting means may depend on the number of linear movement means. It may be worthwhile to provide as many arresting means as linear movement means, but this is not required, as long as the relative position between the cabin attendant seat and the base body may reliably fixed. Furthermore, the actual working principle of the at least one arresting means may be based on a plurality of different devices, which may include releasable positive or non-positive connections.

The apparatus according to an embodiment of the invention provides a reliable, lightweight and space-saving means for holding a cabin attendant seat inside a vehicle cabin, which does not permanently obstruct installation positions for cabin components, leading to a clearly improved capability of providing storage space inside the cabin while not increasing the installation space required.

The at least one holding means for holding a cabin attendant seat comprises an adapter for mechanically connecting the at least one linear movement means with the cabin attendant seat, wherein the adapter is adapted to a desired specific model of the cabin attendant seat. The holding means may be realized in form of an adapting component, i.e. an adapter, or may comprise a separately manufactured adapter attached to the holding means, which adapter is capable to be attached to the linear movement means and, at the same time, to the cabin attendant seat to be held. However, the attachment means may simply be realized as bore holes, recesses, cut-outs and other openings for holding screws or any other components capable of providing a mechanical connection to a cabin attendant seat. The adapter may comprise a flat, surface-like shape.

The at least one linear movement means may comprise a rail and a guide for guiding the rail. The rail and the guide are engageable with each other, which means that the guide comprises a recess and the rail comprises a cross-sectional profile that corresponds with the contour of the guide, which may have one or more undercuts for providing a certain supporting force in a plane perpendicular to the main movement direction.

Further, the at least one arresting means may comprise a locking body engageable with at least one recess arranged in a geometrically fixed relationship with the rail. The recess shall therefore move together with the rail. The recess is responsible for the lockable positions of the movement means by allowing a part of an arresting means to engage with the recess in a positive connection, which is releasable. It is not necessary that the recess is arranged directly inside the rail, but it may also be present in a component attached to the rail, for example the above-mentioned adapter.

The apparatus according to an embodiment of the invention may comprise a plurality of arresting means and a locking mechanism extending in the base body, comprising an operating element and coupled with each of the arresting means. The locking mechanism is therefore considered a mechanism that couples all arresting means to a single operating element, which is to be operated by a crew member.

Advantageously, the locking mechanism is adapted to automatically revert to a locking position when the operating element is not held by an operator. This improves the reliability and safety of operation.

Preferably, the operating element extends through a delimiting face of the base body. The operating element may thereby be easily accessible, while the locking means is completely encapsulated by the base body.

Still further, the apparatus may comprise a curtain, wherein the curtain is at least partially attachable to the base body and configured for extending to a position vertical to a main extension plane of the cabin attendant seat. This allows to provide a distinct privacy protection in operating phases of the vehicle that does not require using the galley or any activities of the crew at all.

The invention also relates to a modular monument for a cabin of a vehicle, comprising at least one monument module having a sidewall, a cabin attendant seat and an apparatus for holding the cabin attendant seat on the sidewall as mentioned above.

The modular monument may comprise a first lateral monument module and a second lateral monument module, wherein the first lateral monument module is a galley module and wherein the second lateral monument module is a toilet module.

The toilet module may comprise a first toilet compartment and an adjacent second toilet compartment.

Still further, in the modular monument the first toilet compartment and the second toilet compartment enclose a removable or retractable separating wall and wherein the first toilet compartment and the second toilet compartment are combinable to a single toilet compartment by removing or retracting the separating wall.

Advantageously, the galley module comprises trolley parking positions for receiving trolleys.

The cabin attendant seat is preferably fixable in at least two of a group of positions, the group comprising:

a trolley-free position with the cabin attendant seat mainly extending in front of the toilet module, a TTL position with the cabin attendant seat extending in front of the toilet module and the galley module in substantially equal parts, and a crew rest position with the cabin attendant seat mainly extending in front of the galley module.

Still further, the invention relates to a vehicle having a cabin and a monument as explained above. The vehicle may preferably be an aircraft having a passenger cabin, which may be pressurized and comprise a pressure bulkhead, in front of which the above mentioned monument having at least one such apparatus for holding a cabin attendant seat is placed. Of course, it may also be possible to provide a monument having a second holder.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

FIG. 2 shows details of the apparatus according to the invention in a three-dimensional view.

FIG. 3 shows an arresting apparatus in a two-dimensional front view.

Finally.

DETAILED DESCRIPTION

Figure 1:
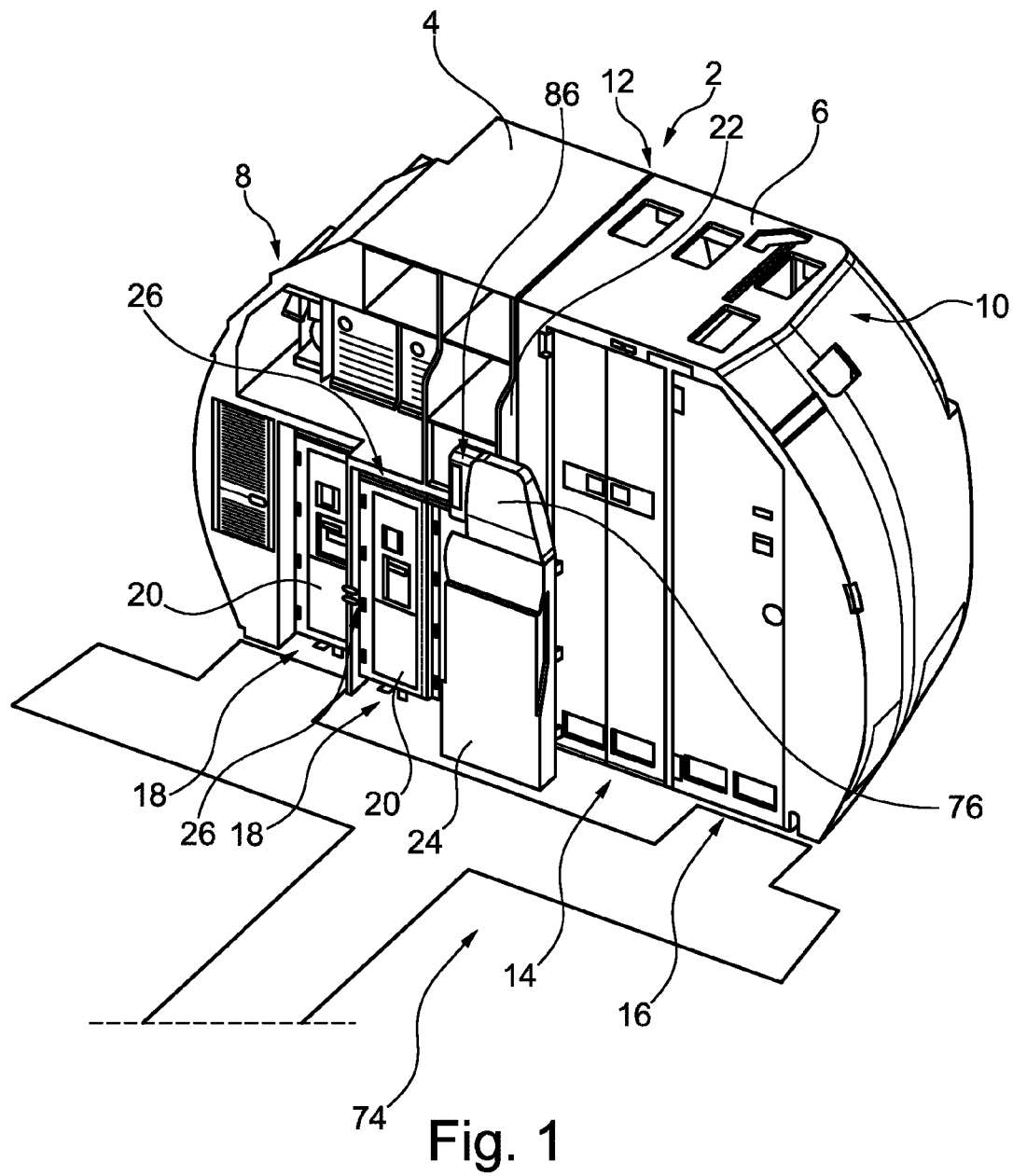
FIG. 1 shows a monument having two toilet compartments and a galley module with an apparatus for holding a cabin attendant seat in a three-dimensional view.

FIG. 1 shows a modular cabin monument 2, which is to be installed at a rear end of an aircraft cabin, delimited by a pressure bulkhead. In the exemplary embodiment, the cabin monument 2 comprises a first lateral segment module 4 and a second lateral segment module 6, which in each case comprise lateral delimiting surfaces 8 and 10, shaped so as to snugly fit with the corresponding aircraft fuselage walls. The two lateral segment modules 4 and 6 are attached to each other in a central region 12 or simply face each other to form an integral monument extending along the whole available width.

Exemplarily, the first lateral segment module 4 is a galley module, while the second lateral segment module 6 is a toilet module having a first toilet compartment 14 with a rather wide bi-fold door and a second toilet compartment 16 having a single, swivellable door.

The first lateral module segment 4 comprises a plurality of trolley parking spaces 18, which are designed for receiving trolleys 20 with different lengths, such as so-called half-size trolleys and full-size trolleys. It is further conceivable that a plurality of trolleys may be arranged one behind the other in a single parking space 18, especially near the center region 12 as there is an enlarged extension due to the pressure bulkhead.

In a position at the center region 12, a sidewall 22 is present, which extends along the longitudinal axis of the cabin, to which sidewall 22 a cabin attendant seat 24 is mounted. In the installed state, the cabin attendant seat 24 is movable in a lateral direction, i.e. along an y-axis and substantially parallel to a front face of the monument 2. How this is achieved will be explained with reference to further figures further below.

FIG. 2 shows a parking space 18, in which a trolley 20 is introduced and arrested by locking bolts 26 for preventing the trolley 20 from leaving the parking space 18 caused by the motion of the vehicle. Adjacent to the parking space 18 and facing the second lateral segment module 6, a base body 28 is attached to the sidewall 22. It is apparent, that the sidewall 22 extends in an x-direction from a front face 30 of the second lateral module segment 6, leading to a step 32.

The basic body 28 has an elongate shape and exemplarily a pentagonal cross-sectional surface, wherein the actual cross-section is designed so as to flushly fill the step 32 in that a front face 34 of the basic body 28 is flush with the adjacent front face 36 of the sidewall 22.

Attached to the front face 34 of the base body 28 are three linear movement means 38, 40 and 42, each having a laterally movable rail 44, a guide 46 for guiding and supporting the respective rail and a flange 48 for attaching the linear movement means 38, 40 and 42 to the front face 34. As clearly visible in FIG. 2, the linear movement means 38 and 40 comprise an integrated arresting means 50 each, which is configured for holding the respective rail 44 in a predetermined discrete position.

According to the exemplary embodiment shown in FIG. 2, three different positions are defined by providing recesses 52, 54 and 56 in fixed positions relative to the rails 44, into which a correspondingly shaped member of the respective arresting means 50 may be introduced in order to provide for a positive, interlocking connection. The positions of the recesses 52, 54 and 56 are responsible for the desired end positions, in which the rails 44 are to be arrested. More details about possible positions will be made hereinafter.

The base body 28 does not need to be a rigid body. It may be sensible to design the base body 28 as a completely hollow component, which may carry a locking mechanism for engaging and disengaging the arresting means 50 in the respective recesses 52, 54 and 56. For this purpose, an upper end face 58 of base body 28 comprises a slit 60, through which a knob 62 extends, which may be moved along the slit 60. Appropriate connecting means, such as levers and rods, lead to engaging and disengaging the arresting means 50.

FIG. 3 shows a frontal view on the linear movement means 38 in greater detail. The arresting means 50 comprises a tapered locking body 64 having a protrusion 66 at an end facing the associated rail 44. By means of a push rod 68, which is swivably ???? held at an end of the locking body 64 facing away from the rail 44, the locking body 64 may at least be moved in a vertical direction, i.e. towards or away from the rail 44, which equals the z-direction in an aircraft-fixed coordinate system. By this motion, the protrusion 66 may enter the recess 52, 54 or 56 or may be moved out of it. If the locking body 64 is in a lower position, in which the protrusion 66 does not engage any recess 52, 54 and 56, the rail 44 may be moved along the guide 46 in a lateral, i.e. y-direction.

For the sake of completeness, it is indicated that the flange 48 comprises a set of boreholes 70, which are configured for fastening the linear movement means 38 to the front face 34 of the base body 28 by means of bolts or other fastening elements.

Figure 4:
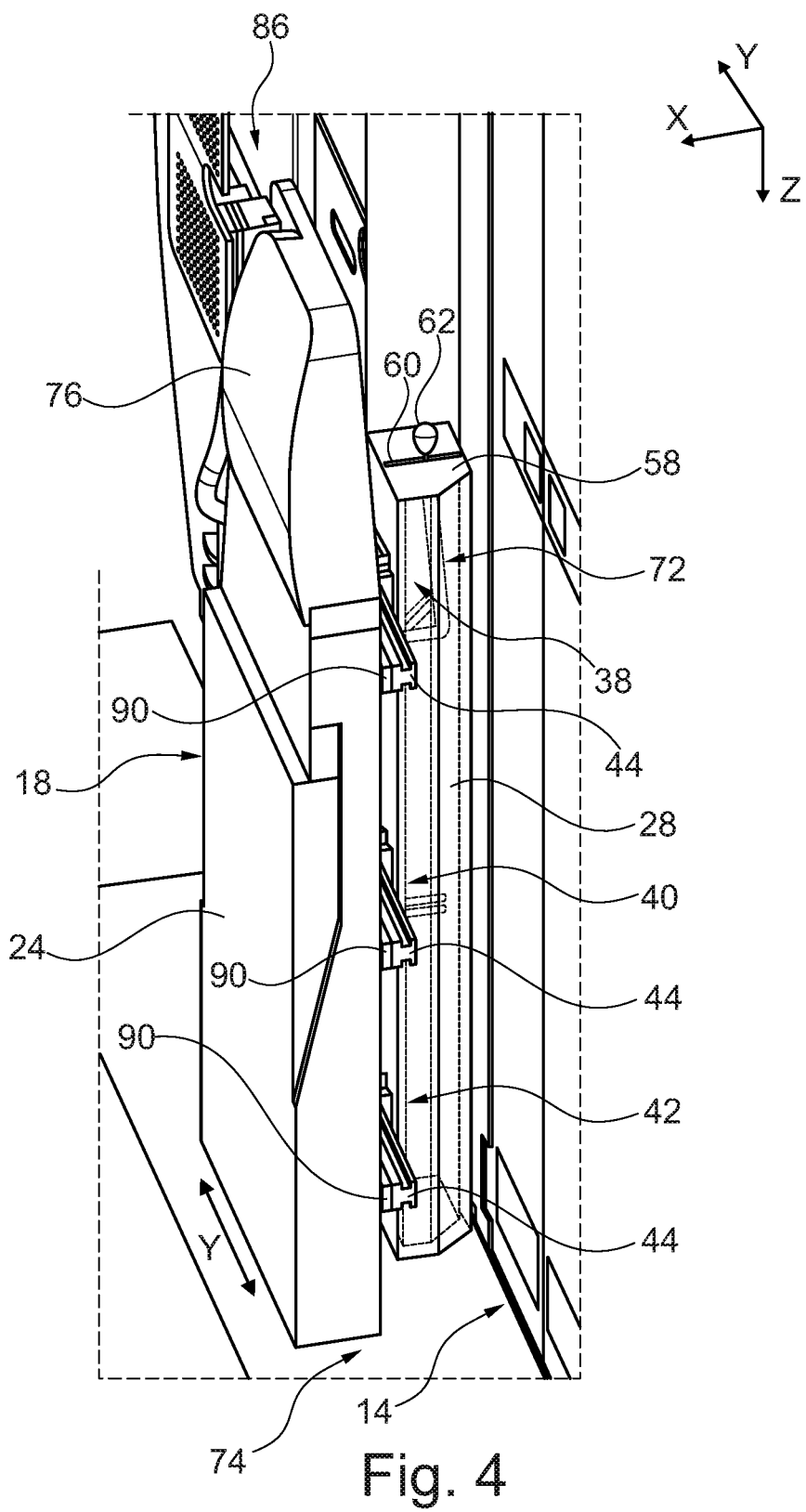
FIG. 4 shows a cabin attendant seat in a middle position (TTL position) and a locking mechanism in a three-dimensional view.

FIG. 4 shows a cabin attendant seat 24 attached to the rails 44 of the linear movement means 38, 40 and 42 as well as the base body 28 in a partially translucent view, in which the locking mechanism 72 is visible. The base body 28 vertically extends substantially to the floor 74 of the cabin, wherein the knob 62 and the slit 60 in the upper face 58 of the base body 28 are situated in a region behind a headrest 76 so as to comprise a suitable vertical position for ergonomic operation.

Figure 5:
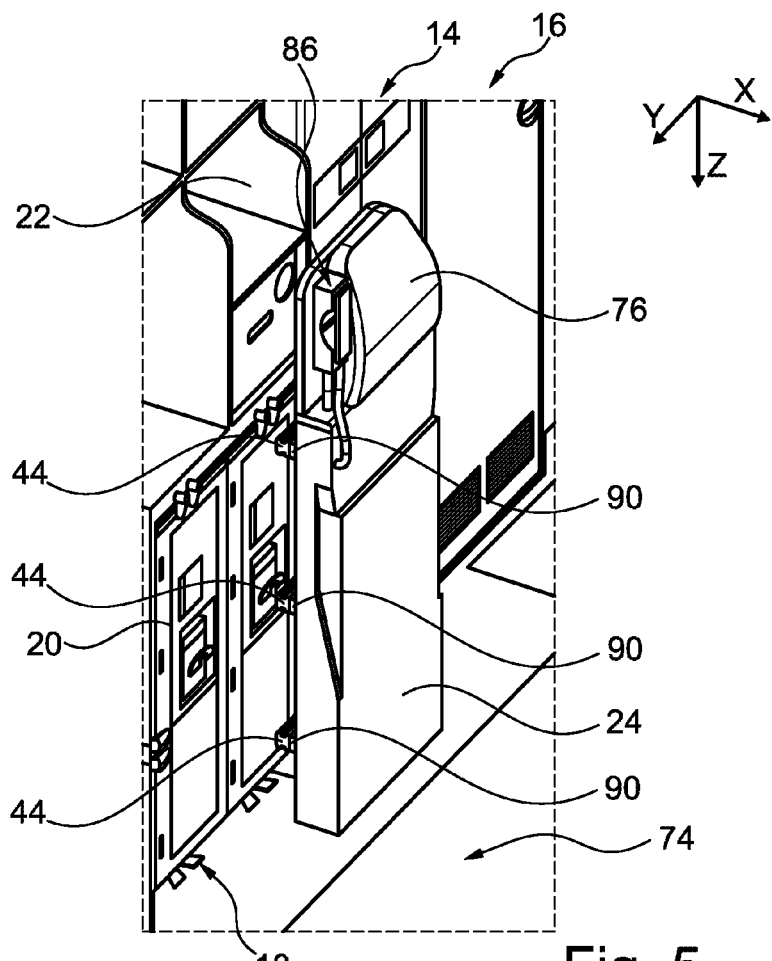
FIG. 5 shows the cabin attendant seat according to FIG. 4 from another perspective in a three-dimensional view.

FIG. 5 shows the cabin attendant seat 24 as attached to the rails 44 from another perspective. It is clearly apparent that the cabin attendant seat 24 may be moved into a region in front of at least one trolley parking position 18, into a region in front of the first toilet compartment 14 or into a region overlapping the trolley parking position 18 or the first toilet compartment 14. This is further shown in FIG. 6, which is a top view onto the cabin attendant seat 24 attached to the rails 44 and arrested in a middle position.

Figure 6:
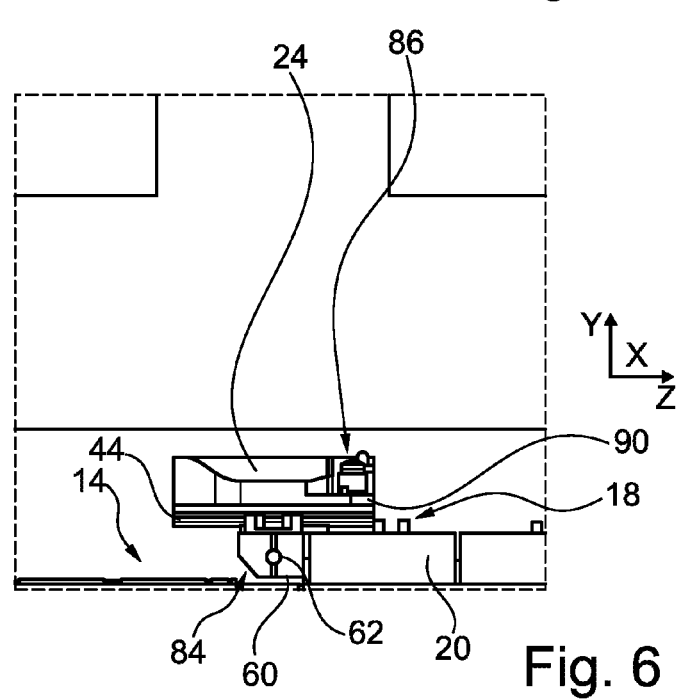
FIG. 6 shows the cabin attendant seat in a middle position (TTL position) in a two-dimensional top view.

In the position of the cabin attendant seat 24 shown in FIG. 6, a bi-fold lavatory door to the first toilet compartment 14 may be opened and closed, as it is not completely blocked by the cabin attendant seat 24. This middle-position may be used in TTL situations (TTL=Taxiing, Takeoff and Landing). In this position, a symmetric load introduction into the structure is accomplished. Furthermore, the latching state of the trolley directly adjacent the cabin attendant seat 24 can be visually checked easily. Other positions are shown further below.

Figure 7:
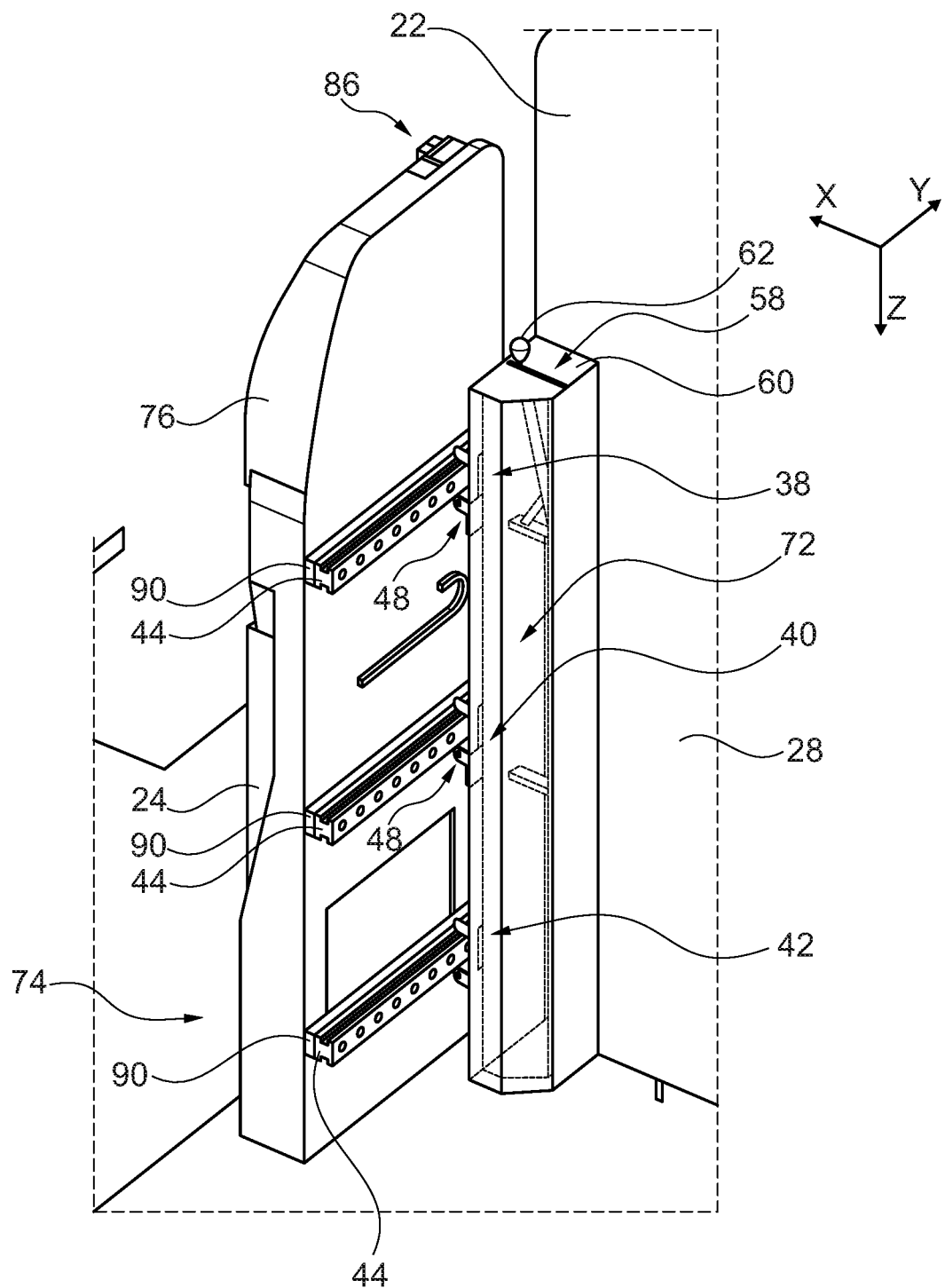
FIG. 7 shows the cabin attendant seat in a trolley-free position from a perspective behind the cabin attendant seat in a three-dimensional view.
Figure 8:
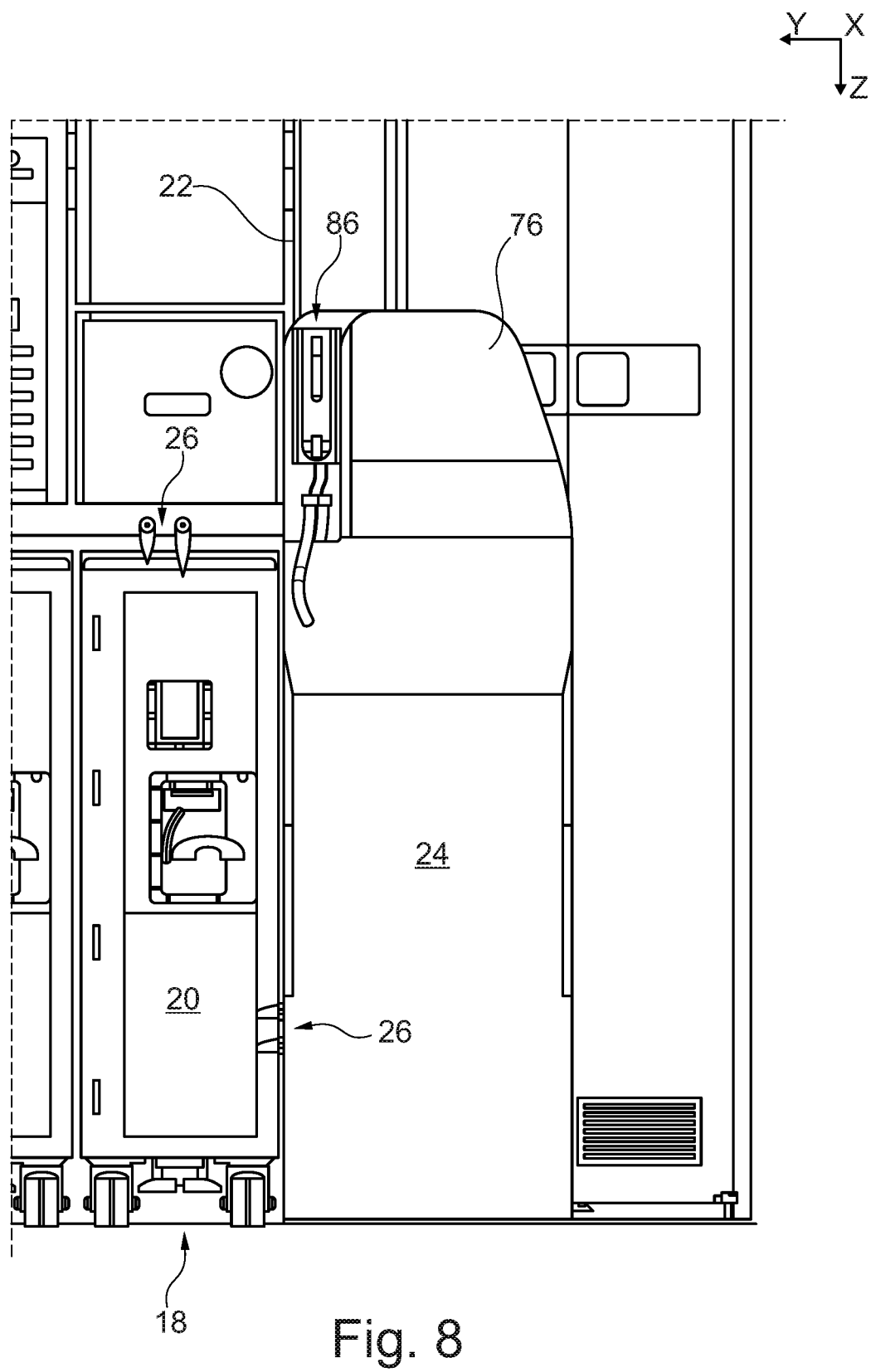
FIG. 8 shows the cabin attendant seat in a trolley-free position in a two-dimensional front view.
Figure 9:
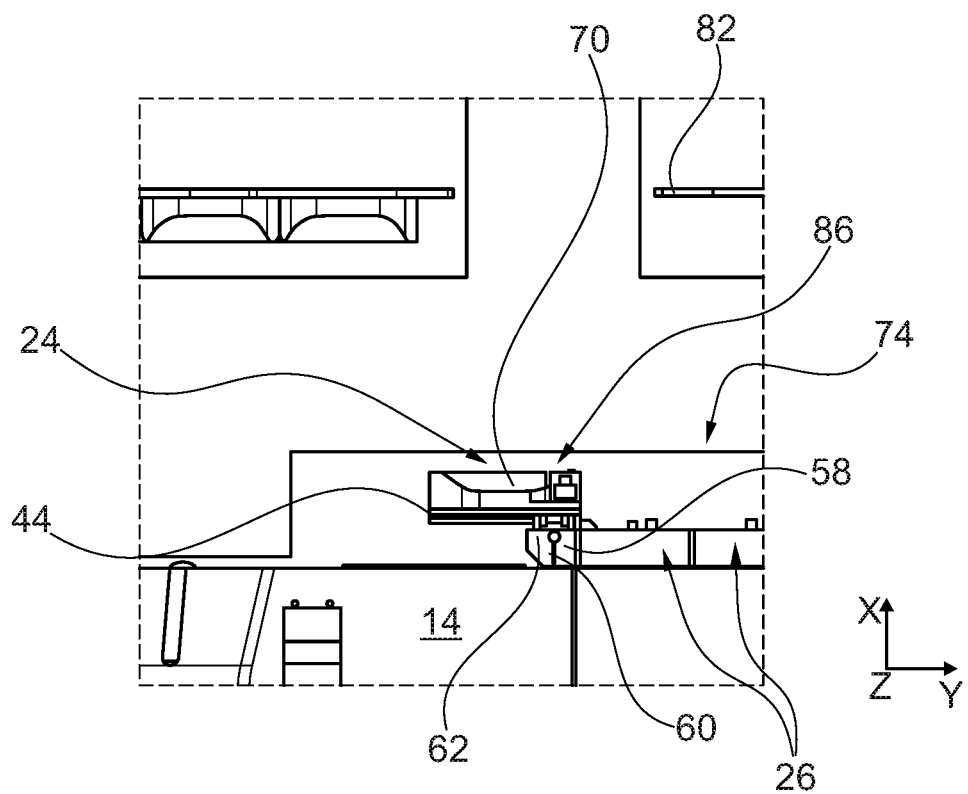
FIG. 9 shows the cabin attendant seat in a trolley-free position in a two-dimensional top view.

An alternative position of the cabin attendant seat 24 is shown in FIGS. 7, 8 and 9. Here, a "trolley-free" position is shown, in which the cabin attendant seat 24 is at its leftmost position from the perspective of a person sitting on the cabin attendant seat 24. Consequently, the cabin attendant seat 24 only extends into a region in front of the first toilet compartment 14 and thus completely blocks the access to it. However, each of the parking positions 18 remains unblocked, which allows the parking positions 18 to be accessible in order to exchange trolleys and other containers in the first segment module 4, for example before or after the passengers are in the cabin.

Figure 10:
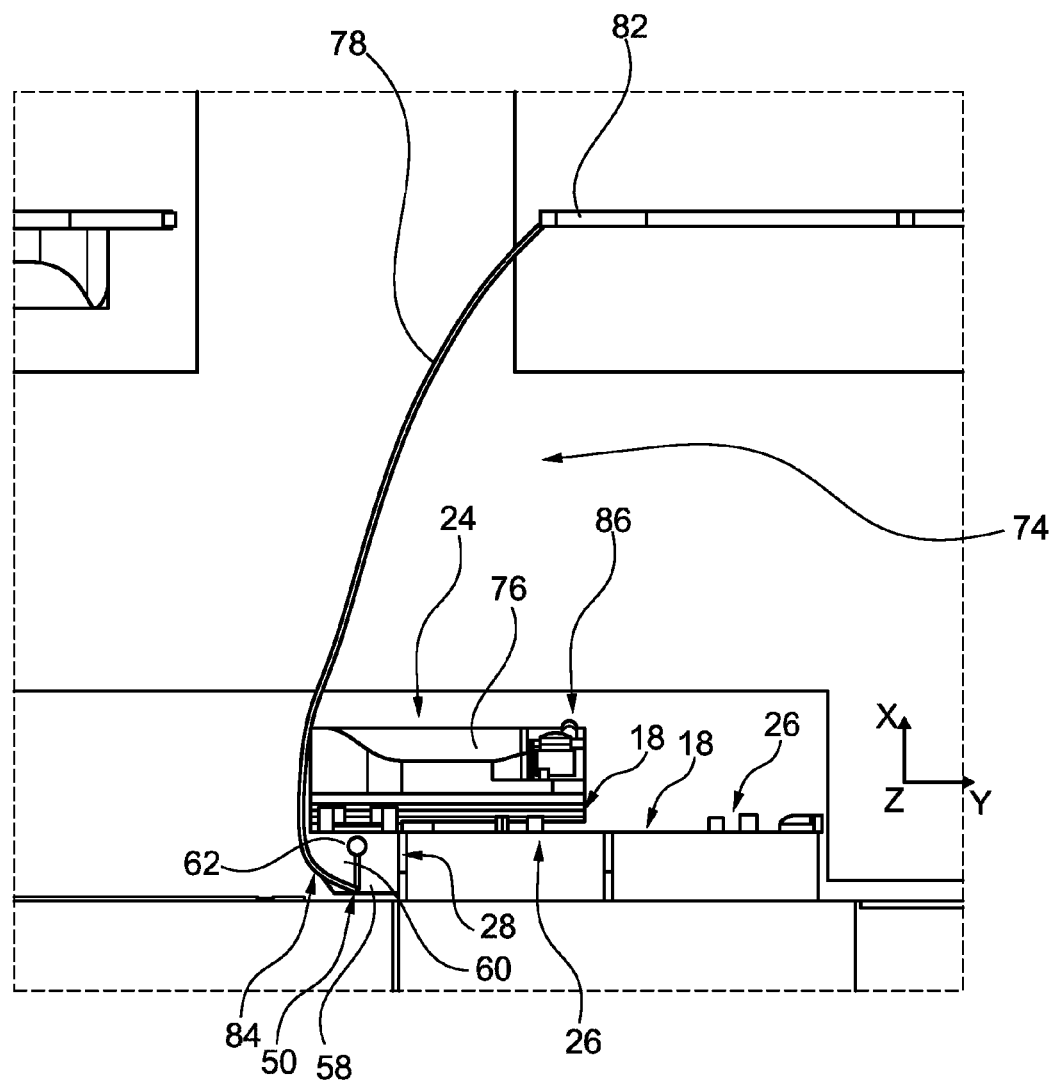
FIG. 10 shows the cabin attendant seat in a crew-rest position with an extended curtain in a two-dimensional top view.
Figure 11:
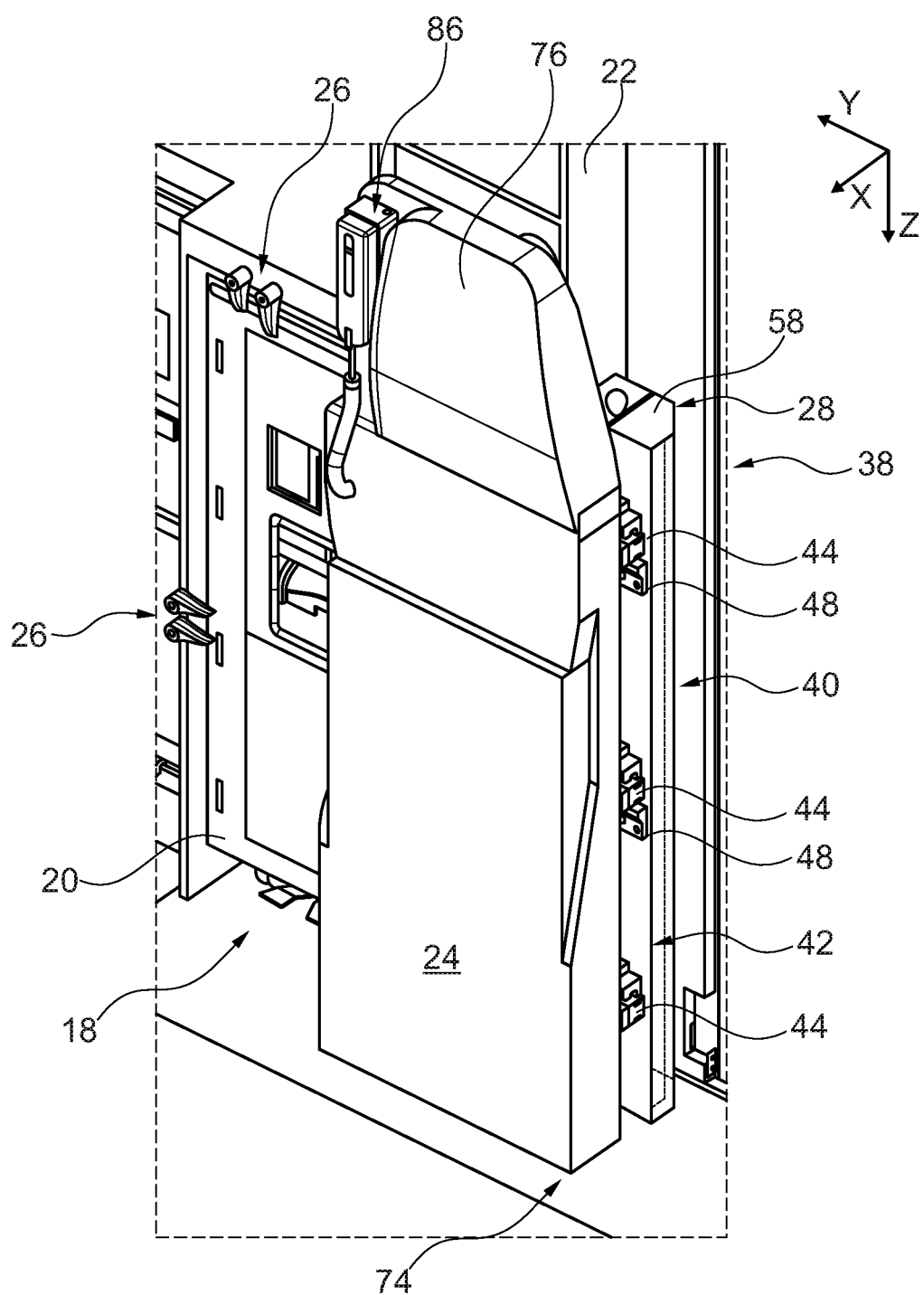
FIG. 11 shows the cabin attendant seat in a crew-rest position without extended curtain in a three-dimensional view.

In FIGS. 10 and 11, a still further position for the cabin attendant seat is shown, which is considered a "crew rest position", in which a cabin crew member may rest on the cabin attendant seat 24. In this position it is possible to attach a curtain between a receiving section 80 on the base body 28 and a partition wall 82 in a distance to the cabin attendant seat 24 in x-direction, i.e. vertical to the main extension plane of the cabin attendant seat 24. For this purpose, the curtain 78 may be rolled out of a container integrated into the base body 28 or out of a container integrated into the partition wall 82. For the ease of fixation, the base body does not comprise a completely rectangular cross-section but a triangular cut-out 84 to receive the curtain 78.

By pulling the cabin attendant seat 24 to this side, i.e. directly into a region in front of the centremost trolley parking position 18, the first toilet module 14 is completely unblocked, while at the same time the crew enjoys a sufficient privacy protection.

Figure 12:
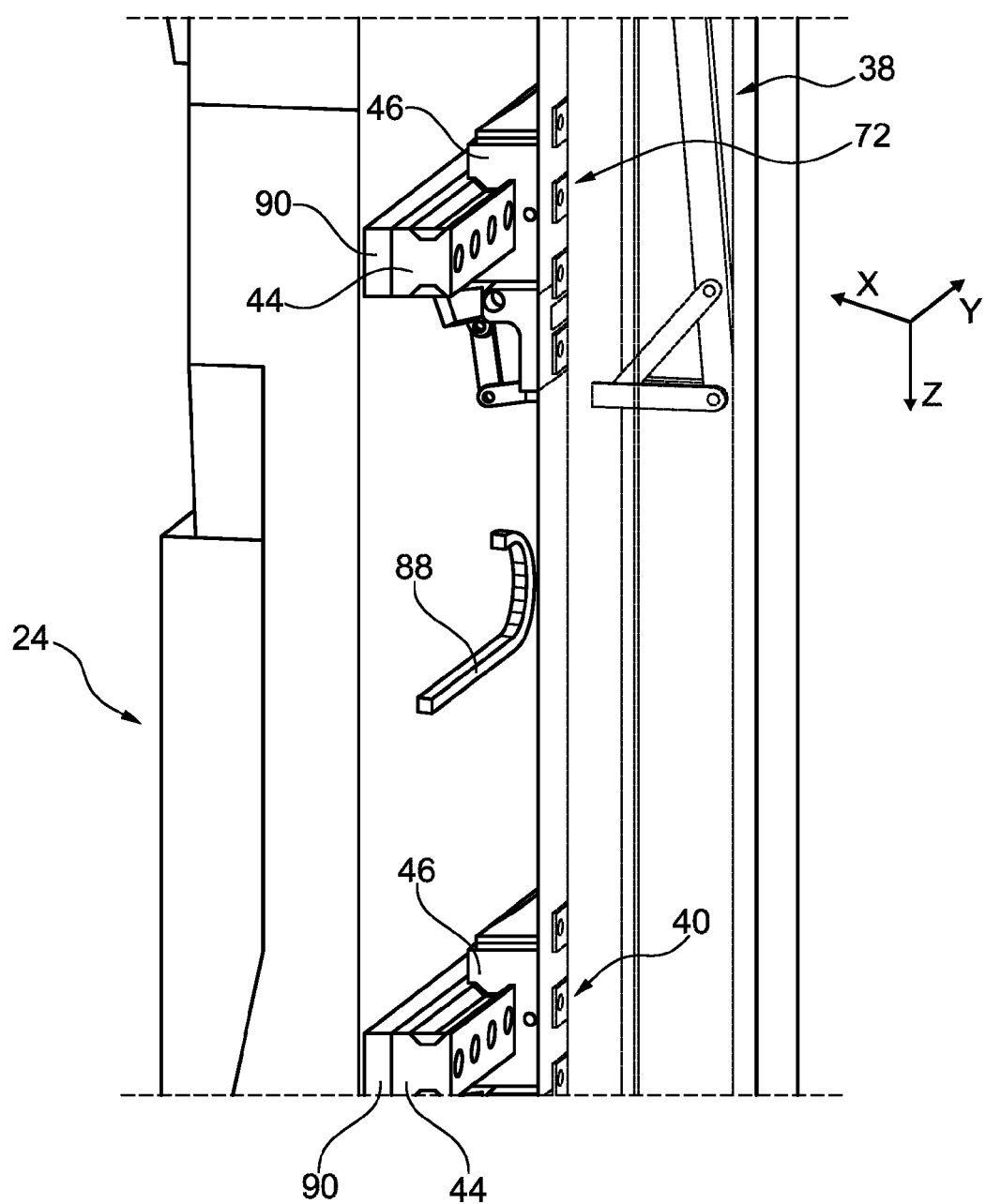
FIG. 12 shows a detail of the arresting means in a three-dimensional drawing.
Figure 13:
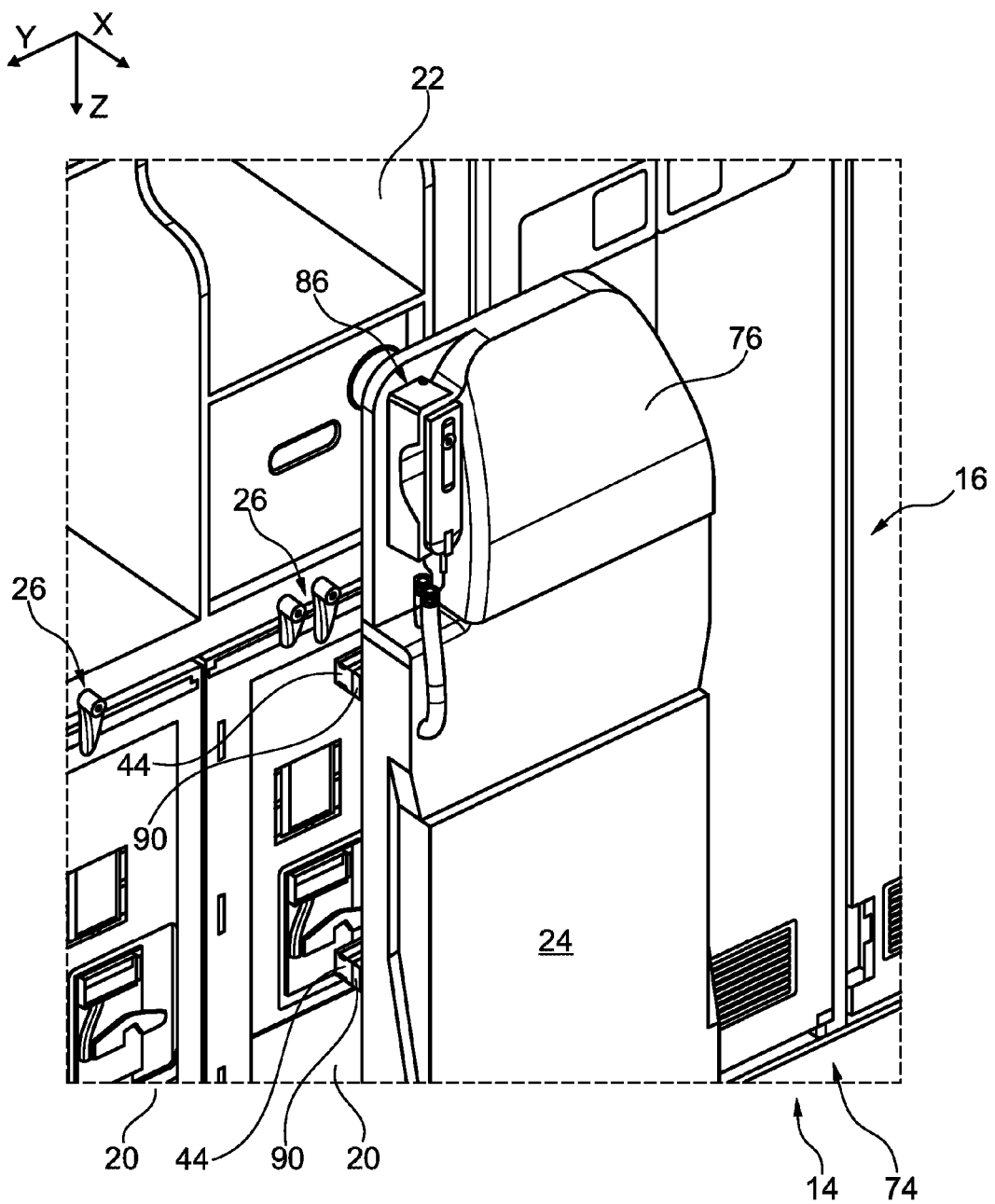
FIG. 13 shows a detail of the cabin attendant seat and a handset in a three-dimensional view.

As shown in FIGS. 12 and 13, which depict details of the cabin attendant seat 24 in an installed position, a headset 86 may be installed adjacent to the headrest 76 for allowing a crew member sitting on the cabin attendant seat to communicate with other crew members or for making announcements to the cabin. In this regard, it is necessary to provide electrical connections from an positionally fixed aircraft system to the cabin attendant seat 24, which may accomplished by at least one cable integrated into a so-called energy chain 88 that allows the compensation of the three different predetermined positions of the cabin attendant seat 24.

In FIG. 12, it is furthermore clearly visible that a rail 44 may be connected with an adapter 90, which allows for a connection with a standard cabin attendant seat, i.e. a wall mountable cabin attendant seat. As these may have different borehole positions, depending on the model or make, individual adapters 90 may be used for connection to the rail 44 without requiring to use different rails 44 for considering the vehicle operator's requirements for seats to be used.

Still further, the guide 46 is clarified as a dovetail guide that allows for a rigid and stable mechanical connection between the rail and the guide 46.

Figure 14A:
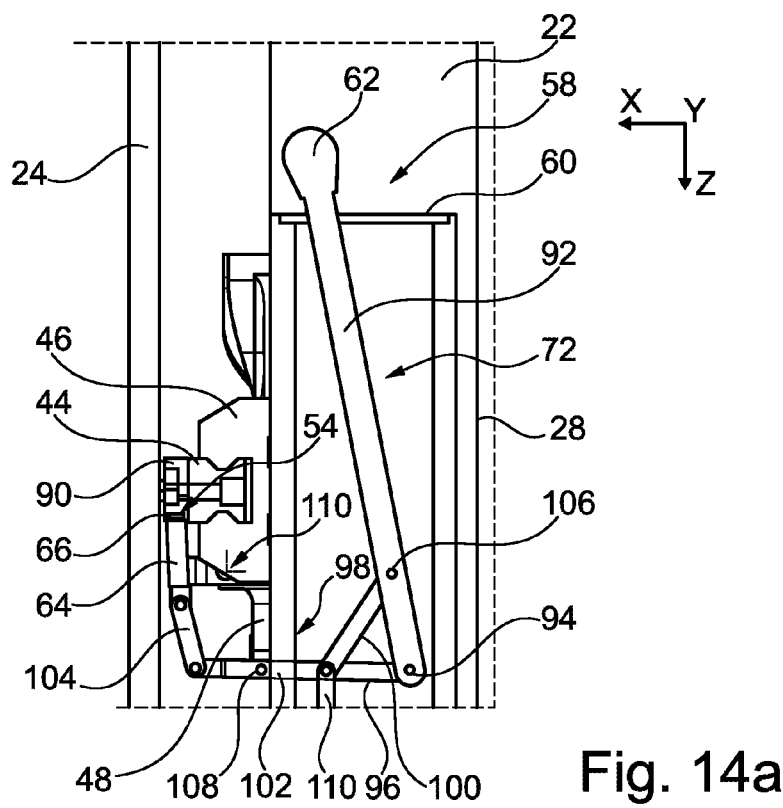
FIGS. 14a and 14b show details of an arresting means and a locking mechanism in two-dimensional lateral views.
Figure 14B:
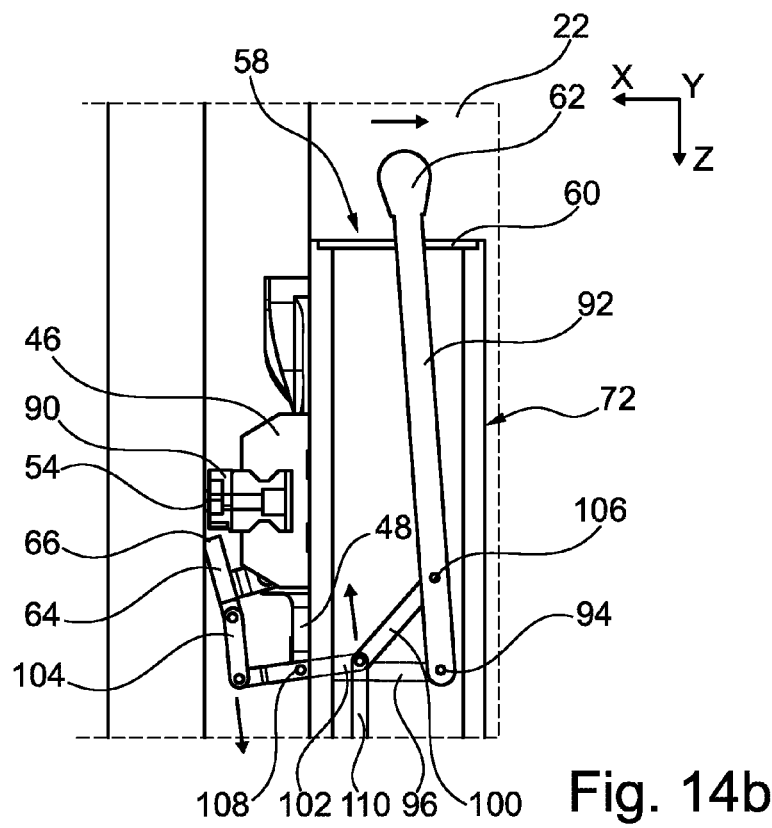

As presented in FIGS. 14a and 14b, the mechanism 72 comprises a set of levers arranged for moving the locking body 64 upward and downward. The knob 62 is connected to a main lever 92, which extends to a first pivoting point 94, about which the main lever 92 is pivotally coupled. This means that by pulling the knob 62 in the drawing plane of FIG. 14A to the right it rotates with an end opposite to the knob 62 around the first pivoting point 94. The first pivoting point 94 is created through a holder 96, which extends from an inner walling surface 98 of the base body 28 into its interior. It is also conceivable that the holder 96 is a part of the flange 48, which extends from the outside into the base body 28.

Three interconnected levers 100, 102 and 104 constitute a lever chain extending from a second pivoting point 106, which is situated on the main lever 92, to the respective locking body 64. The center lever 102 is pivotally supported on a third pivoting point 108, which is located on the flange 48.

The locking body 64 further is pivotally supported on a fourth pivoting point 110, which is located on the guide 46 or flange 48 with an end opposite to the protrusion 66 of the locking body. In FIG. 14a, the protrusion 66 engages the recess 54 in the adapter 90 mounted to rail 44 while it is disengaged in FIG. 14b.

In FIG. 14a, the knob 62 is in a position facing the cabin attendant seat 24. By moving the knob 62 to a position in a greater distance to the cabin attendant seat 24, the main lever 92 rotates about the first pivoting point 94 and thereby pulls the chain of levers 100, 102 and 104. Consequently, the middle lever 102 rotates about the third pivoting point 108 and thereby pulls the third lever 104 downwardly. Due to coupling the third lever 104 and the locking body 64, the protrusion 66 is pulled out of recess 54. Thereby, the positive connection between the locking body 64 and the recess 54 in the adapter 90, are disengaged.

It is conceivable to integrate springs (not shown) in order to urge the main lever 92 always to a side facing the cabin attendant seat 24 and/or a pressure spring or a spiral spring to always urge the protrusion 66 upwardly, such that it snaps into an aligning recess on the adapter 90. Therefore, the positive connection between the locking body 64 and the linear movement means may be disengaged by moving the knob 62 into a position at a greater distance to the cabin attendant seat, moving the cabin attendant seat 24 in a lateral direction through the moving means, releasing the knob 62 and align the cabin attendant seat into one of the predetermined positions, in which the locking body snaps into the respective recess and automatically locks the cabin attendant seat in this position.

Figure 15:
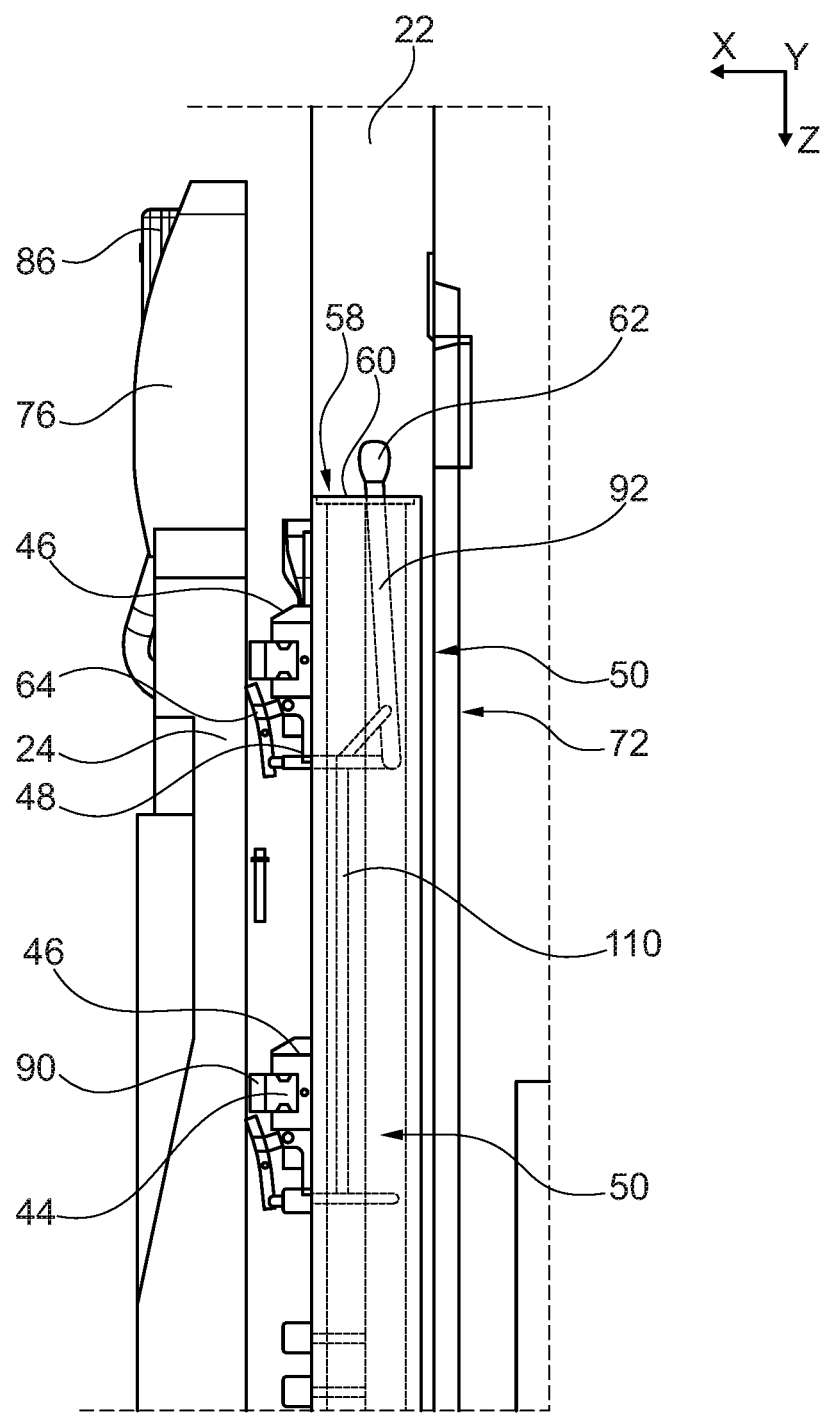
FIG. 15 shows two arresting means in a lateral view.

In FIG. 15 it is shown that a connecting lever 110 may be extending between two middle levers of two arresting means 50, wherein the connecting lever connects to a pivoting point between levers 100 and 102. Hence, by moving the knob 62, both arresting means 50 are operated.

As a supplement, it should be noted that "comprising" does not exclude any other elements or steps, and that "a" or "an" does not exclude a plurality. It should furthermore be noted that characteristics described with reference to one of the above exemplary embodiments can also be used in combination with other characteristics of other above-described exemplary embodiments. Reference symbols in the claims should not be interpreted in a restrictive sense.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An apparatus for holding a cabin attendant seat in a cabin of a vehicle, comprising:
   a base body attachable to a wall surface in the cabin;
   at least one holding means for holding a cabin attendant seat;
   at least one linear movement means; and
   at least one arresting means,
   wherein the at least one linear movement means is attached to the base body and supports the at least one holding means,
   wherein the at least one linear movement means is configured for laterally moving the at least one holding means between at least two laterally distanced discrete positions such that the cabin attendant seat is configured to accommodate an individual in each of the at least two laterally distanced discrete positions of the at least one holding means, and
   wherein the at least one arresting means is coupled with the at least one linear movement means and is configured for arresting the at least one linear movement means in the at least two discrete positions.

2. The apparatus of claim 1, wherein the at least one holding means for holding a cabin attendant seat comprises an adapter for mechanically connecting the at least one linear movement means with the cabin attendant seat, and
   wherein the adapter is adapted to a desired specific model of the cabin attendant seat.

3. The apparatus of claim 1, wherein the at least one linear movement means comprises a rail and a guide for guiding the rail.

4. The apparatus of claim 3, wherein the at least one arresting means comprises a locking body engageable with at least one recess arranged in a fixed geometrical relationship to the rail.

5. The apparatus of claim 1, comprising a plurality of arresting means and a locking mechanism extending in the base body, comprising an operating element and coupled with each of the arresting means.

6. The apparatus of claim 5, wherein the locking mechanism is adapted to automatically revert to a locking position when the operating element is not held by an operator.

7. The apparatus of claim 5, wherein the operating element extends through a delimiting face of the base body.

8. The apparatus of claim 1, further comprising a curtain, wherein the curtain is at least partially attachable to the base body and configured for extending to a position vertical to a main extension plane of the cabin attendant seat.

9. A modular monument for a cabin of a vehicle, comprising:
   at least one monument module having a sidewall;
   a cabin attendant seat; and
   an apparatus for holding the cabin attendant seat on the sidewall, the apparatus comprising:
   a base body attachable to a wall surface in the cabin;
   at least one holding means for holding a cabin attendant seat;
   at least one linear movement means; and
   at least one arresting means,
   wherein the at least one linear movement means is attached to the base body and supports the at least one holding means,
   wherein the at least one linear movement means is configured for laterally moving the at least one holding means between at least two laterally distanced discrete positions such that the cabin attendant seat is configured to accommodate an individual in each of the at least two laterally distanced discrete positions of the at least one holding means, and
   wherein the at least one arresting means is coupled with the at least one linear movement means and is configured for arresting the at least one linear movement means in the at least two discrete positions.

10. The modular monument according to claim 9, comprising a first lateral monument module and a second lateral monument module,
    wherein the first lateral monument module is a galley module and wherein the second lateral monument module is a toilet module.

11. The modular monument according to claim 10, wherein the toilet module comprises a first toilet compartment and an adjacent second toilet compartment.

12. The modular monument according to claim 11, wherein the first toilet compartment and the second toilet compartment enclose a removable or retractable separating wall, and
    wherein the first toilet compartment and the second toilet compartment are combinable to a single toilet compartment by removing or retracting the separating wall.

13. The modular monument according to claim 10, wherein the galley module comprises trolley parking positions for receiving trolleys.

14. The modular monument according to claim 10, wherein the cabin attendant seat is fixable in at least two of a group of positions, the group consisting of:
    a trolley-free position with the cabin attendant seat mainly extending in front of a toilet module,
    a TTL position with the cabin attendant seat extending in front of a toilet module and a galley module in substantially equal parts, and
    a crew rest position with the cabin attendant seat mainly extending in front of a galley module.

15. The modular monument according to claim 9, further comprising a first lateral monument module and a second lateral monument module,
    wherein the cabin attendant seat is fixable in at least two of a group of positions, the group consisting of:
    a trolley-free position with the cabin attendant seat mainly extending in front of the first monument module,
    a TTL position with the cabin attendant seat extending in front of the first monument module and the second monument module in substantially equal parts, and
    a crew rest position with the cabin attendant seat mainly extending in front of the second monument module.

16. A vehicle, having a cabin and a monument arranged in the cabin, the monument comprising:
    at least one monument module having a sidewall;
    a cabin attendant seat; and
    an apparatus for holding the cabin attendant seat on the sidewall, the apparatus comprising:
    a base body attachable to a wall surface in the cabin;
    at least one holding means for holding a cabin attendant seat;
    at least one linear movement means; and
    at least one arresting means,
    wherein the at least one linear movement means is attached to the base body and supports the at least one holding means,
    wherein the at least one linear movement means is configured for laterally moving the at least one holding means between at least two laterally distanced discrete positions such that the cabin attendant seat is configured to accommodate an individual in each of the at least two laterally distanced discrete positions of the at least one holding means, and wherein the at least one arresting means is coupled with the at least one linear movement means and is configured for arresting the at least one linear movement means in the at least two discrete positions.

\* \* \* \* \*